United States Patent [19]

Gosswiller

[11] 4,286,254
[45] Aug. 25, 1981

[54] ROTATING SIGNAL LIGHT WITH VARIABLE VOLTAGE LAMP CIRCUIT

[75] Inventor: Earl W. Gosswiller, Clarendon Hills, Ill.

[73] Assignee: Federal Signal Corporation, Oak Brook, Ill.

[21] Appl. No.: 100,503

[22] Filed: Dec. 5, 1979

[51] Int. Cl.³ .......................... B60Q 1/46; H02P 5/08
[52] U.S. Cl. ........................................ 340/84; 340/50; 340/87; 362/35; 362/170; 315/200 A; 350/99; 307/10 LS
[58] Field of Search .................. 340/84, 81 R, 50, 98, 340/87, 110, 118, 128, 131, 366 D; 362/35, 170, 188, 193, 255, 43, 269, 69, 171-174, 219; 350/288, 97, 168, 100, 101, 107, 289, 307, 285, 99; 322/8; 315/200 A; 307/10 LS

[56] References Cited

U.S. PATENT DOCUMENTS

| 1,657,816 | 1/1928 | Bonner | 323/96 |
| 1,915,319 | 6/1933 | Jones | 362/35 |
| 2,218,013 | 10/1940 | Tice et al. | 362/35 |

FOREIGN PATENT DOCUMENTS 127365 6/1919 United Kingdom ...................... 362/35

Primary Examiner—John W. Caldwell, Sr.
Assistant Examiner—Donnie L. Crosland
Attorney, Agent, or Firm—Charles F. Pigott, Jr.

[57] ABSTRACT

A rotating signal light for use on police cars, ambulances and other vehicles on which a warning light is required, the light being connected with a variable voltage lamp circuit which provides a higher voltage in predetermined rotational positions of the lamp to produce enhanced light in certain directions while providing a lower voltage in other positions of the light to increase lamp life and reduce wattage requirements.

6 Claims, 3 Drawing Figures

ROTATING SIGNAL LIGHT WITH VARIABLE VOLTAGE LAMP CIRCUIT

BRIEF SUMMARY OF THE INVENTION

The present invention relates to a rotating signal light for use on emergency and other vehicles, such as police cars and ambulances, and in particular to a rotating light supplied with power from a variable voltage lamp circuit which provides increased voltage in certain predetermined rotational positions of the light in order to produce increased intensity light flashes in selected directions while providing reduced voltage when the lamp is aimed in other directions where light flashes of reduced intensity are sufficient.

It is possible to vary the effective intensity of a rotating light by varying its speed of rotation. A method and apparatus for increasing effective light intensity by varying the speed of rotation of a light are disclosed in my copending application, Ser. No. 46,173, filed June 7, 1979, which application is assigned to the assignee of the present invention. However, the present invention concerns a light which is rotated at a constant speed.

In accordance with a preferred embodiment of the present invention, a rotatable light is mounted on the roof of an emergency vehicle for rotation about an approximately vertical axis to direct light in all directions from the vehicle. It will be understood that from a particular vantage point, such as forwardly of the emergency vehicle on which the light is mounted, the effect is a series of inermittent light flashes which are effective as a warning signal.

In many such applications, it is of greater importance to have high intensity light flashes in certain directions, as for example forwardly of the vehicle, or forwardly and rearwardly, compared to other directions such as to the sides of the vehicle. The present invention is related to a rotating light for applications of the foregoing type where light flashes of maximum intensity are not required in all directions.

The intensity of light emitted in a given direction from a rotating lamp, i.e., the candlepower of the lamp in a given direction, is proportional to lamp voltage. Specifically, candlepower is proportional to voltage taken to the 3.5 power. Accordingly, a relatively small reduction in voltage will afford a much more significant reduction in candlepower. On the other hand, a relatively small increase in lamp voltage will produce a much more significant reduction in lamp life, since lamp life is inversely proportional to lamp voltage taken to the 12th power.

It is therefore a general object of the present invention to provide a rotatable warning light in conjunction with a variable voltage lamp circuit, which light is more efficient than conventional constant voltage lights and has unusually long life.

A more specific object of the invention is to increase lamp life for a rotating warning light by providing maximum lamp voltage only when the lamp is aimed in certain predetermined directions where maximum intensity light flashes are required and by reducing lamp voltage when the lamp is aimed in other directions.

In furtherance of the foregoing objectives, it is preferred to use a lamp of a type which normally has a relatively short life at normal voltage, but offers high light efficiency. By using such a lamp in accordance with the present invention, the high light efficiency offered by the lamp at normal voltages can be achieved in certain relatively short selected positions of the light, and yet the normal limited life of such a high intensity lamp can be significantly increased by reducing lamp voltage in other positions of the light.

In other words, it will be understood that high efficiency lamps normally have only a relatively short life, whereas lamps which offer a long life normally afford only relatively low light efficiency. It is an object of the present invention to utilize a lamp of the type which offers high efficiency and a relatively short life at normal voltage, and to increase the lamp life significantly by reducing voltage during a significant portion of the time during which the lamp is operated, thereby achieving maximum light efficiency in selected directions while achieving extended lamp life.

A further more specific object of my invention is to provide a rotating light for mounting on the top of an emergency vehicle, which light is used in conjunction with a variable voltage lamp circuit providing relatively high voltage when the lamp is aimed forwardly of the vehicle, or forwardly and rearwardly, while providing reduced voltage when the lamp is aimed to the sides of the vehicle.

The foregoing and other objects and advantages of the invention will be apparent from the following description of a preferred embodiment, taken in conjunction with the accompanying drawings.

DESCRIPTION OF THE DRAWINGS

FIG. 3 is a schematic wiring diagram showing the manner in which variable voltage power is supplied to a rotating lamp and constant voltage is supplied to a motor for rotating a lamp holder.

Now, in order to acquaint those skilled in the art with the manner of making and using my invention, I shall describe, in conjunction with the accompanying drawings, a preferred embodiment of the invention.

DETAILED DESCRIPTION OF THE INVENTION

Figure 1:
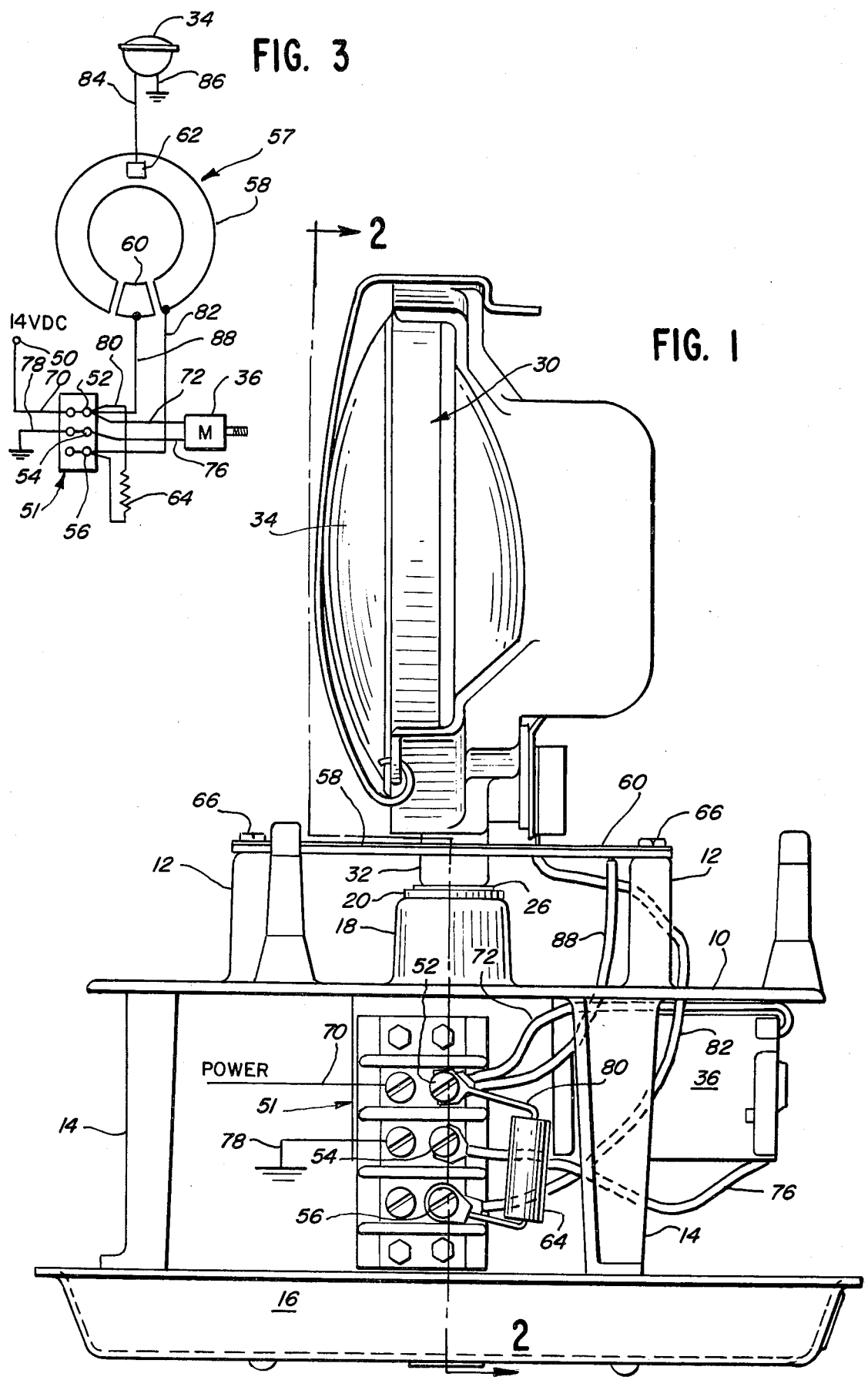
FIG. 1 is a side elevational view of a rotating light assembly constructed in accordance with the present invention.
Figure 2:
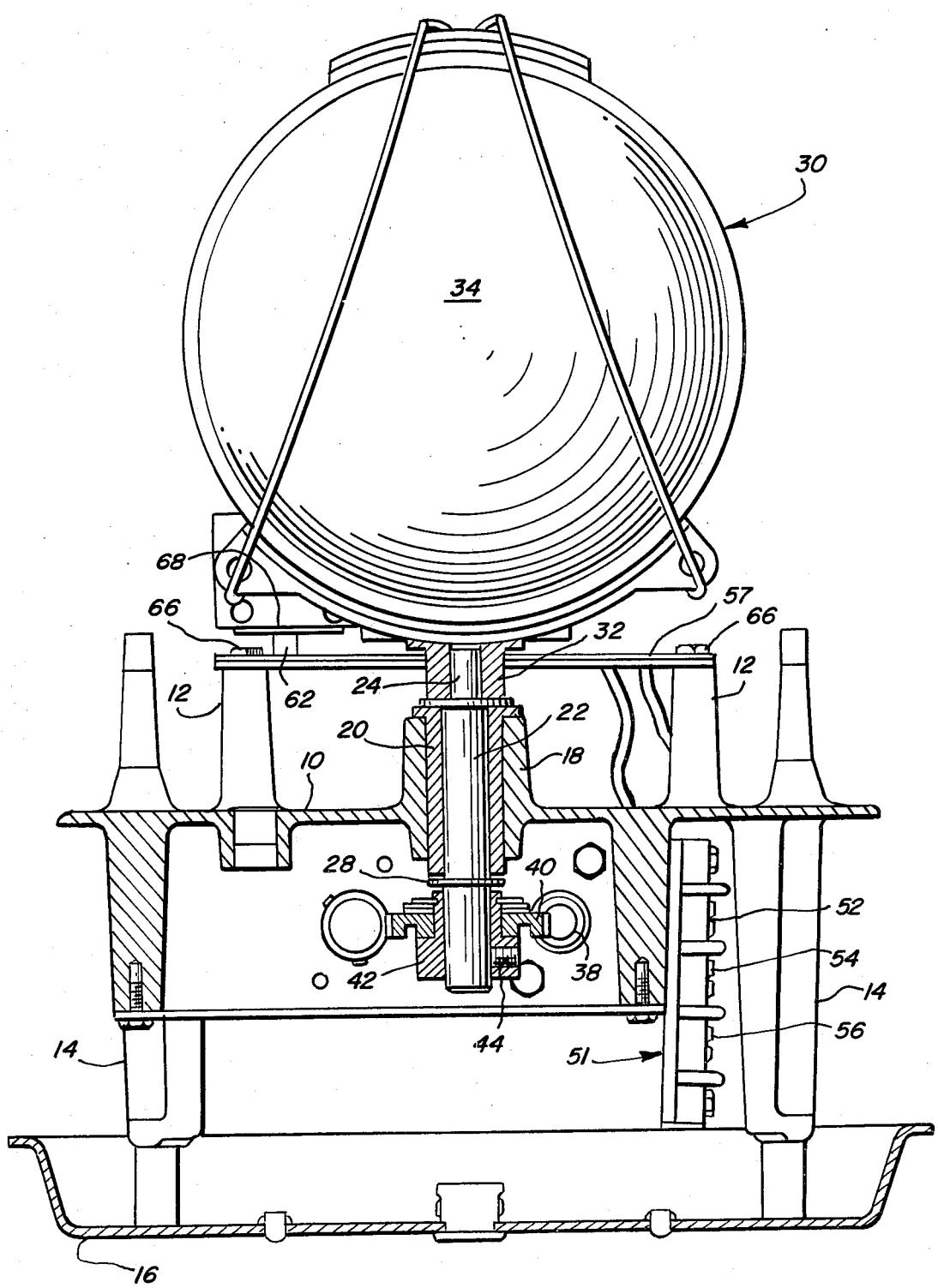
FIG. 2 is a vertical section taken substantially along the line 2—2 of FIG. 1.

Referring to the drawings, FIGS. 1 and 2 illustrate a mounting platform 10 having four upwardly extending mounting posts 12, and four depending leg members 14 which terminate at a base 16. Base 16 may be secured by bolts or the like to the roof of an emergency vehicle, such as a police car or ambulance.

At the center of the mounting platform 10 there is a vertical integral sleeve 18, best shown in FIG. 2 in which is mounted a bushing 20. A light supporting shaft 22 is journaled in bushing 20, and shaft 22 includes a reduced diameter upper shaft portion 24. A washer 26 is mounted on the shaft at the top of bushing 20, and a second washer 28 is located on the shaft at the underside of the bushing.

A lamp holder 30 includes a mounting sleeve 32 at its lower end which mounts over the upper end 24 of shaft 22. The sleeve 32 is secured to shaft end 24 by a press fit or threads or other means which fixedly mounts lamp holder 30 on shaft 22 for conjoint rotation therewith.

Lamp holder 30 carries a lamp 34 which directs light in a 360 degree arc as shaft 22 is rotated. FIG. 1 shows a constant speed motor 36 which drives a worm 38

(shown in FIG. 2), and worm 38 meshes with a worm gear 40. Worm gear 40 is keyed or otherwise fixedly mounted on a mounting sleeve 42 which mounts over the lower end of shaft 22 and is fixedly secured thereto by a set screw 44. In the foregoing manner, motor 36 rotates lamp holder 30 causing lamp 34 to rotate continuously about the approximately vertical axis of shaft 22 thereby producing light flashes in all horizontal directions from an emergency vehicle on which the warning light is mounted.

Reference is now made to FIG. 3 which is a schematic wiring diagram of a variable voltage lamp circuit in accordance with the present invention. A 14 VDC power source is shown at 50, and also a terminal board 51 having terminals 52, 54 and 56. A segmented collector ring 57 is also illustrated, comprising a large ring segment 58 and a small ring segment 60. There are further shown a brush 62 which cooperates with the collector ring segments, and a resistance 64.

Most of the foregoing components are also shown in FIGS. 1 and 2 which illustrate collector ring segments 58 and 60 secured on the top of posts 12 by screws 66. Fig. 2 also shows brush 62 mounted on the underside of a bracket 68 which is a part of a lamp holder 30 and rotates therewith. During rotation of lamp holder 30 by motor 36, brush 62 moves around the top of collector ring 57 engaging seriatim with ring segments 58 and 60. As will be explained more fully hereinafter, the relatively short ring segment 60 is located in a predetermined position to assure it will be in contact with brush 62 when lamp 34 is facing a direction in which it is desired to provide high intensity light flashes, e.g., when lamp 34 is facing forwardly relative to the emergency vehicle on which it is mounted.

Referring again to FIG. 3, power source 50 is connected through lead 70 to terminal 52 which in turn connects to motor 36 through lead 72. Motor 36 is connected to terminal 54 through lead 76, and the latter terminal is grounded through lead 78. Thus, when the light assembly is operative, motor 36 is driven continuously from power source 50 to rotate lamp holder 30 and lamp 34 at a constant speed.

In accordance with the present invention, lamp voltage is varied as lamp 34 rotates. In the embodiment described, the lamp is operated at normal or relatively high voltage when brush 62 is engaged with ring segment 60, and the lamp is operated at reduced voltage during the major portion of the 360 degree revolution of the lamp when brush 62 is engaged with ring segment 58. As shown in FIG. 3, when brush 62 is engaged with ring segment 58, power 50 is connected through lead 70, terminal 52, lead 80, resistance 64, terminal 56, lead 82, ring segment 58, brush 62 and lead 84 to lamp 34 which is grounded through lead 86.

Because of the presence of resistance 64 in the above-described circuit, lamp 34 receives reduced voltage during that portion of each revolution when brush 62 is engaged with ring segment 58. However, during that portion of each revolution that brush 62 is engaged with ring segment 60, power source 50 is connected through lead 70, terminal 52, lead 88, ring segment 60, brush 62 and lead 84 to lamp 34. Accordingly, resistance 64 is shorted out of the lamp circuit during that portion of each revolution that brush 62 engages ring segment 60, and therefore lamp 34 is operated at a higher voltage to emit higher intensity light.

As explained above, ring segment 60 is located so lamp 34 will be operated at higher voltage when it is aimed in a predetermined direction in which it is desired to provide greater light intensity. By way of example, when the light assembly is mounted on a police car, it may be desired to locate ring segment 60 so lamp 34 will operate at higher voltage when aimed forwardly relative to the police vehicle.

It will be understood more than one section of increased voltage may be provided for each revolution of the lamp. For example, two ring segments 60 may be provided in opposed relation so that increased intensity light flashes will be produced when the lamp is aimed either forwardly or rearwardly relative to the emergency vehicle on which it is mounted, and yet the lamp may still be operated at reduced voltage during a major portion of each revolution.

It is important to understand that by using the present invention it is possible to provide very high intensity light in selected areas with relatively low power, and at the same time achieve relatively long lamp life which is quite important with emergency rotating warning lights. In contrast, it is normally necessary to choose between high efficiency and long life, since available lamps do not normally afford both characteristics.

Moreover, in many applications for rotating warning lights, it is not necessary to provide the same high intensity light in all directions. Thus, in the case of a rotating light mounted on the top of a police car, it is often considered important to provide high intensity light flashes only in a direction forwardly of the vehicle, or forwardly and rearwardly, whereas lower intensity light flashes may be sufficient in other directions.

In addition to achieving longer lamp life, it is also important that use of the present invention reduces wattage requirements for a rotating warning light. For example, certain U.S. Government specifications for rotating light systems for emergency vehicles set relatively high minimum light intensity requirements in the front and rear directions, and a minimum flash rate, and also set relatively low amperage requirements which must not be exceeded by a complete lighting system. The present invention offers an improved lighting system capable of satisfying such demanding requirements.

One specific example of a lamp which can be used with the present invention is a No. 4509 aircraft landing lamp which has a normal useful life of 25 hours. Such a lamp is capable of providing high light intensity, and yet its normal relatively short life can be increased substantially if it is operated at a reduced voltage during a major portion of its operating time.

What is claimed is:

1. A rotatable signal light assembly for use on emergency vehicles comprising, in combination, a lamp mounted for rotation about a generally upright axis for producing light flashes in a plurality of generally radial directions during each 360 degree lamp revolution, drive means for rotating said lamp at a substantially uniform rate of speed, and voltage control means operative during each said revolution to provide increased lamp voltage during a first predetermined portion of said revolution and reduced lamp voltage during a second predetermined portion of said revolution, thereby to produce increased intensity light flashes when said lamp is aimed in predetermined radial directions corresponding to said first predetermined portion of said revolution and light flashes of lesser intensity when said lamp is aimed in other radial directions corresponding to said second predetermined portion of said revolution.

2. A rotatable signal light assembly as defined in claim 1 where said voltage control means includes a power source, and circuit means between said power source and said lamp, said circuit means including a second circuit including a resistance and a first circuit shorting said resistance, and position responsive means for connecting said first circuit when said lamp is in said first predetermined portion of said revolution and for connecting said second circuit when said lamp is in said second predetermined portion of said revolution.

3. A rotatable signal light assembly as defined in claim 2 where said position responsive means includes stationary collector ring means having at least two ring segments, and brush means mounted for rotation with said lamp, said ring segments being connected with respective ones of said first and second circuits, and said brush means being engageable seriatim with said ring segments during rotation of said lamp for effecting variation in said lamp voltage during each revolution of said lamp.

4. A rotatable signal light assembly as defined in claim 1 where said lamp is a relatively high intensity lamp having relatively short life when operated continuously at said increased voltage but significantly longer life when operated at said reduced voltage.

5. A rotatable signal light assembly as defined in claims 1, 3 or 4 where said voltage control means is coordinated with the rotational position of said lamp to provide said increased lamp voltage when said lamp is aimed generally forwardly relative to an emergency vehicle on which said lamp is mounted and to provide said reduced lamp voltage during other positions of said lamp, whereby said increased intensity light flashes are produced when said lamp is aimed generally forwardly and said light flashes of lesser intensity are produced when said lamp is aimed in other directions.

6. A rotatable signal light assembly as defined in claim 5 where said voltage control means is coordinated with the rotational position of said lamp to provide said increased lamp voltage when said lamp is aimed generally forwardly and generally rearwardly relative to an emergency vehicle on which it is mounted and to provide said reduced lamp voltage during other positions of said lamp.

* * * * *